June 26, 1962   D. A. CHURCH ET AL   3,040,565
FILM STRESS TRANSDUCER
Filed Jan. 7, 1960
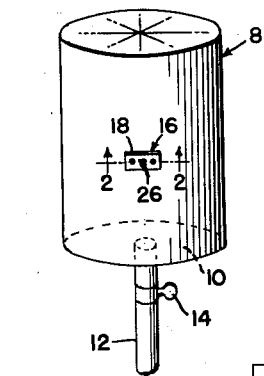
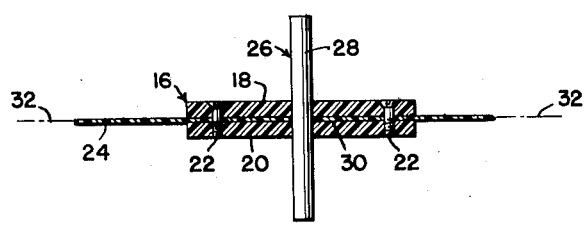
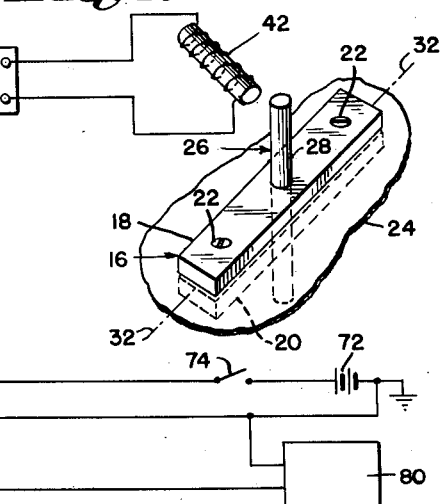
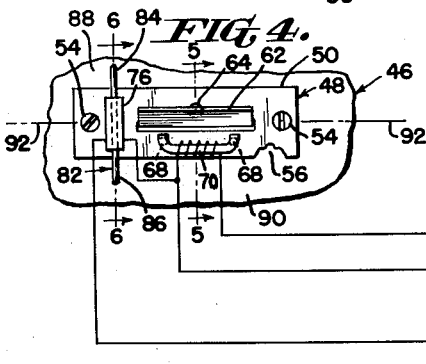
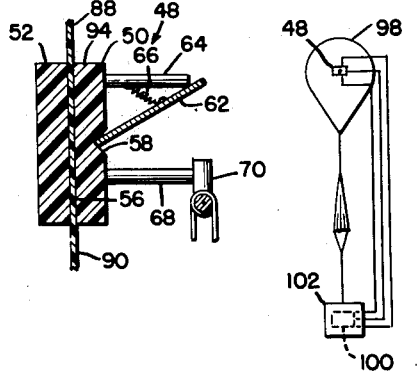
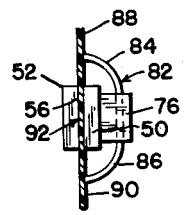
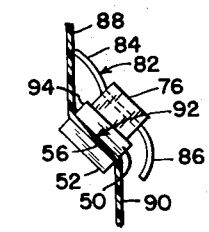
David A. Church,
Richard L. Schwoebel,
INVENTORS
BY Louis Sheldon
ATTORNEY

United States Patent Office 3,040,565
Patented June 26, 1962

3,040,565
FILM STRESS TRANSDUCER
David A. Church, Coon Rapids, Minn., and Richard L. Schwoebel, Ithaca, N.Y., assignors, by mesne assignments, to the United States of America as represented by the Secretary of the Navy
Filed Jan. 7, 1960, Ser. No. 1,144
13 Claims. (Cl. 73—88.5)

This invention relates to film stress transducers and is concerned more particularly with the determination of the existing stress in the film of an inflated film structure such as a life raft, an inflated enclosure, a high altitude balloon, etc.

It is an object of the invention to provide apparatus for accurately and readily determining the tensile stress which plastic film, or a selected part thereof, of an inflated structure is undergoing.

It is also an object to provide an apparatus of this character which the operator can read directly in the field.

An additional object is to provide a film-tension measuring apparatus which will signal and desired information to a remote station.

Further objects and advantages of the invention will appear as the description proceeds.

The invention will be better understood on reference to the following description and the accompanying more or less schematic drawing, in which:

FIG. 1 shows part of an apparatus for calibrating a gage in accordance with the invention.

FIG. 2 is an enlarged sectional view taken as indicated at 2—2 in FIG. 1.

FIG. 3 shows the gage of FIG. 1 with additional mechanism for use either in calibrating the gage or in practice.

FIG. 4 shows a modified form of the invention.

FIG. 5 is an enlarged sectional view taken at 5—5 in FIG. 4.

FIG. 6 is taken as indicated at 6—6 in FIG. 4.

FIG. 7 is similar to FIG. 6 but shows the distortion due to vibration of the gage.

FIG. 8 shows a modification of FIG. 4.

Referring now more particularly to the drawing, disclosing illustrative embodiments of the invention, there is shown at 8 (FIG. 1) a film cylinder adapted for use in calibrating apparatus of the invention. The cylinder 8 is closed at one end and at its other end 10 is closed except for a tube 12 connected to a pressure gage 14 and an air pump (not shown) by which the cylinder may be subjected to different known air pressures to correspondingly stress the film. For each such pressure the tensile stress in the film can be readily computed. The apparatus according to one form of the invention may comprise a gage 16 (FIGS. 1 to 3) including lucite or other suitable rectangular plates 18 and 20 tightly clamped as by screws 22 to opposite faces of the cylinder wall 24, and a steel pin 26 or other suitable member whose outer portion 28 is to serve as an armature, the pin being secured to one or both of the plates and centrally located so that the center of mass of the gage is at the center point of the rectangular wall portion 30 between the plates, and the longitudinal axis 32 of the gage passing through the center of mass and extending normal to the direction of the stress under consideration. The cylinder 8 is of sufficient diameter to insure that the film portion 30 will be substantially flat for practical purposes when the cylinder is inflated. A diameter of about two feet is suitable.

A calibration curve for the gage 16 is obtained from the resonant frequencies of the gage corresponding to the film stresses at the several pressures. For determining each resonant frequency there is employed a unit 34 comprising a variable frequency audio oscillator 36 provided with frequency indicating means 38 and preferably containing its own power supply, a power amplifier 40 coupled to the oscillator, and an electromagnet 42 coupled to the amplifier. The unit 34 is preferably portable, and the operator holds the electromagnet 42 close to the armature 28 in a position to vibrate the gage 16 about its longitudinal axis 32. The frequency of vibration is a function mainly of the film stress in the direction normal to said axis and the moment of inertia of the gage about said axis. At each pressure the frequency is adjusted until the gage 16 undergoes sudden wide amplitude, indicating that the gage is at resonant frequency for that pressure. The characteristic calibration curve can then be drawn.

To determine the tensile stress in a predetermined substantially flat portion of any given inflated film material used in an inflated structure in the field, a gage 16 is mounted on an intermediate part of that portion of the film, vibrated by the unit 34, the resonant frequency observed at 38, and, using the calibration curve, the tensile stress corresponding to that resonant frequency found.

A modified apparatus in accordance with the invention is indicated generally at 46 in FIG. 4, and comprises a gage 48 including a pair of lucite or other suitable outer and inner plates 50 and 52 clamped as by screws 54 to a film portion 56 which will be flat or substantially flat when the structure of which it forms a part is inflated. The plate 50 is formed with a groove 58 parallel to its longitudinal axis, an armature such as a steel plate 62 is pivotally seated in the groove, a stop 64 is secured to the plate at one face of the armature, and a spring 66, which may be secured to the armature and stop, biases the armature toward the stop and also against escape from the groove. Mounted at the other face of the armature 62, as on posts 68 secured to the plate 50, is an electromagnet such as a horseshoe electromagnet 70 serving as a shock coil powered by a battery 72 under the control of a switch 74. Also mounted on the plate 50 is an electromechanical pick-up, for example a transducer 76 comprising a piezo-electric crystal connected electrically to a chart recorder 80. An oscilloscope could be used in place of the recorder 80, but the latter is preferred in the interest of providing a permanent record. A metallic or non-metallic wire 82 is intermediately suitably secured to the transducer crystal and has resilient end portions 84 and 86 serving as feelers which touch with light pressure the outside face of the film portions 88 and 90 adjacent the respective longitudinal edges of the plate 50 when said film portions are coplanar with the clamped film portion 56 (FIG. 6).

The film structure being inflated, the apparatus 46 operates as follows:

On closing of the switch 74, the electromagnet 70 causes the armature 62 to suddenly strike the electromagnet, causing the gage 48 to vibrate about the longitudinal axis 92 of the plate structure at a fixed frequency which is the resonant frequency corresponding to the then tensile stress in the film portions 88 and 90, the amplitude being of coursed damped. The switch 74 should be held closed to hold the armature 62 against the electromagnet 70 until the vibration has come substantially to an end, usually a second or two being sufficient. This vibration results in relative motion between the gage 48 and the film portions 88 and 90; these film portions extend either in the same plane (FIG. 6) or in parallel planes, and, when not coplanar, afford with the film portion 56 various Z-shaped formations, one being shown exaggerated in FIG. 7. As the angle between the film portion 88 and the longitudinal edge face 94 of the plate 50 is reduced from 90°, the feeler 84 is resiliently flexed and thus mechanically stresses the crystal; as the angle enlarges toward 90°, the feeler and hence the crystal relaxes. When the film portions 56, 88, and 90 become coplanar (FIG. 6), relaxation is complete. In like manner, as the vibration cycle continues, the feeler 86 is resiliently flexed to mechanically stress the crystal but in the opposite direction. At the completion of a vibration cycle the crystal has undergone a cycle of mechanical stress which is translated into a cycle of alternating voltage which will appear on the oscilloscope or chart recorder 80. This voltage being a function of the frequency, the tensile stress in the film area at the gage 48 can be readily obtained from a stress vs. resonant frequency calibration curve obtained as by using this gage with the cylinder 8.

If the site of the gage 48 is not too remote, the wiring from the electromagnet 70 and transducer 76 may extend to the receiving station as shown in FIG. 4. If too remote from the receiving station, for example if the gage 48 is mounted on a portion of the film of a free high altitude balloon 98 (FIG. 8), the wiring from the gage and transducer 76 is extended to a radiosonde 100 in the gondola 102, where the power supply may be located and the switch 74 may be closed at timed intervals by means of a timer (not shown). The radiosonde 100 will send a signal at the resonant frequency of the gage 48, and this signal will be detected at the receiving station, where the information will appear on an oscilloscope or on a chart recorder. In the case of a high altitude balloon, for example, it may be desirable to ascertain the tensile stress in a large number of film portions of the inflated balloon at different altitudes. Accordingly a number of gages 48 will be fastened to the balloon film at different levels of the balloon envelope so that a complete picture of the film stresses substantially throughout the length of the envelope and substantially throughout the ascent and descent can be obtained. Armed with this information the designer of balloons can determine that thickness of film which will withstand the stresses which can be expected to be encountered in any flight, and thus avoid using film which is too thin or excessively thick. Too thick a film unnecessarily increases expense and balloon weight and reduces the payload that can be carried.

It will be apparent from the foregoing that simple apparatus has been provided for accurately determining, either in the field or at a remote station, the stresses in selected portions of the film of an inflated film structure.

The fabric may be of any desired character, of which plastic film such as polyethylene and Mylar are examples. Balloons generally use a film thickness of a small fraction of one mil up to a few mils.

The transducer may be of any suitable type, such as a phonograph cartridge used as a pick-up to produce an A.C. signal from mechanical oscillation, the feelers being used in place of the usual needle. The phasing is then such that the instrument is sensitive to the oscillatory motion initiated by the magnetic actuator. Should for any reason the device oscillate in an additional mode, for example normal to the plane of the film portion under consideration, the phasing will be such that no A.C. signal will be produced from such additional oscillation. Therefore the device is sensitive only to the desired vibrations.

While preferred constructions and operations are herein described in some detail, they should not be regarded as restrictions or limitations, as many changes may be made in construction and arrangement of parts without departing from the spirit and scope of the invention.

We claim:

1. In an apparatus for use in determining film tension in a predetermined direction of an inflated film structure having a substantially flat film portion, a relatively small rigid body clamped to opposite faces of an intermediate part of said portion, the center of mass of said body and part being located in said part, means adjacent said body for oscillating said body and part as a unit at resonant frequency about an axis which is normal to said direction and lies in said part and passes through the center of mass, and means coupled to the oscillating means for indicating the frequency of resonance.

2. In an apparatus for use in determining film tension in a predetermined direction of an inflated film structure having a substantially flat film portion, an electromagnet, a pair of plates between which an intermediate part of said film portion is sandwiched, an armature fixed to one of the plates and disposed in the field of said electromagnet, said plates, intermediate part, and armature constituting a rigid body having its center of mass in said part, means for energizing said electromagnet to oscillate said body at resonant frequency about an axis which is normal to said direction and lies in said part and passes through the center of mass, and means coupled to said energizing means for indicating the frequency of resonance.

3. In an apparatus for determining film tension in a predetermined direction of a flat film portion under tension, means secured to an intermediate part of said film portion and constituting with said part a rigid body having its center of mass in said part, means adjacent said body for oscillating said body at resonant frequency about an axis which is normal to said direction and lies in said part and passes through the center of mass of said body, and means coupled to the oscillating means for indicating the frequency of resonance.

4. In an apparatus for determining film tension in a predetermined direction of a flat portion under tension, a pair of identical rectangular plates between which an intermediate part of said portion is clamped, said plates and part constituting a rigid unit having its center of mass in said part, means for oscillating said unit about an axis which is normal to said direction and lies in said part and passes through the center of mass, and at the resonant frequency corresponding to the tension in said direction, and means coupled to the oscillating means for indicating the frequency of resonance.

5. In an apparatus for determining tension in a predetermined direction in a relatively small substantially flat fabric portion of an inflated free high altitude balloon, a structure mounted on an intermediate rectangular part of said portion and comprising a pair of identical relatively small rectangular plates sandwiching said part, and an armature fixed to one of the plates, said structure and part constituting a rigid unit having its center of mass in said part, and means for oscillating said structure and part as a unit about an axis which is normal to said direction and lies in said part and passes through the center of mass, and at the resonant frequency corresponding to the tension in said direction, said means comprising an electromagnet positioned to influence the armature, and a variable frequency audio oscillator coupled to the electromagnet for exciting the electromagnet.

6. In an apparatus for indicating the tension in a predetermined direction in a relatively small substantially flat fabric portion of an inflated free high altitude balloon, a structure mounted on an intermediate part of said portion, means for pulsing the structure to vibrate with said part as a unit about an axis which lies in said part and is normal to said direction, and at a frequency corresponding to the stress, the structure comprising means responsive to the relative movement between the structure and the fabric near the structure for translating the vibration into an electric signal.

7. In an apparatus for determining tension in a predetermined direction in a relatively small substantially flat fabric portion of an inflated free high altitude balloon, a structure mounted on an intermediate rectangular part of said portion, the longitudinal axis of said part being normal to the direction of tension, said structure comprising inner and outer rectangular plates sandwiching and coterminous with said part, an electromagnet mounted on the outer plate, an armature mounted on the outer plate and located in the field of and biased away from the electromagnet, means coupled to the electromagnet for pulsing the electromagnet to cause the armature to strike the electromagnet in a direction to subject the structure and part as a unit to damped vibration about said axis at a frequency corresponding to the tension in the fabric portion in said predetermined direction, a piezoelectric crystal mounted on the outer plate for movement as a unit therewith, and resilient feelers connected to the crystal and touching the fabric portion at the respective sides of the outer plate when the entire fabric portion is planar, whereby, when the structure and part vibrate as aforesaid, the feelers are alternately flexed and thereby stress the crystal at said frequency.

8. The structure of claim 7, together with means electrically connected with and responsive to the stressing of the crystal for producing an electric signal of said frequency.

9. In an apparatus for determining tension in a predetermined direction in a relatively small substantially flat portion of the film of an inflated free high altitude film balloon, a body mounted on an intermediate part of said portion and including a transducer, and means connected with said body for vibrating said body and part as a unit about an axis which lies in said part and is normal to said direction, and at a frequency corresponding to the tension in said direction, said transducer being provided with means responsive to the relative movement between said unit and the film which is adjacent said part and is spaced from said axis, for translating the vibration of said unit into an electric signal of said frequency.

10. The structure of claim 9, characterized in that the transducer comprises a piezo-electric crystal, and the translating means comprises resilient feeler means connected to the crystal, the feeler means engaging the film portion which is adjacent said part and is spaced from said axis, whereby, when the unit vibrates as aforesaid, the feeler means is flexed during each cycle and thereby mechanically stresses the crystal at said frequency.

11. The structure of claim 9, characterized in that the transducer comprises a piezo-electric crystal, and the translating means comprises a pair of resilient feelers connected to the crystal, the feelers engaging the film which is adjacent said part and is respectively at opposite sides of said axis, whereby, when the unit vibrates as aforesaid, the feelers are flexed during each cycle and thereby mechanically stress the crystal at said frequency.

12. A balloon system comprising a plastic film envelope inflated with lift gas and having a relatively small substantially flat inflated film portion, a body fixed to an intermediate part of said portion, a transducer mounted on the body for bodily movement therewith, and means connected with the body for vibrating said body and part as a unit about an axis which lies in said part, and at a frequency corresponding to the tension in said portion in a direction normal to said axis, said transducer being provided with means responsive to the relative movement between said unit and the film portion which is adjacent said part and is spaced from said axis, for translating the vibration of said unit into an electrical signal of said frequency, and means carried by the system for telemetering the signal.

13. The structure of claim 12, together with means carried by the system for intermittently actuating the vibrating means so that successive signals may be obtained to indicate variations, if any, in the tension of said portion during inflation, ascent, floating, or descent of the system.

References Cited in the file of this patent

UNITED STATES PATENTS

| | | |
|---|---|---|
| 2,320,390 | Shmurak | June 1, 1943 |
| 2,466,327 | Rieber | Apr. 5, 1949 |
| 2,792,707 | Anderson | May 21, 1957 |